US009975187B2

(12) United States Patent
Suehara

(10) Patent No.: US 9,975,187 B2
(45) Date of Patent: May 22, 2018

(54) CERAMIC END MILL AND METHOD FOR CUTTING DIFFICULT-TO-CUT MATERIAL USING THE SAME

(71) Applicant: MITSUBISHI HITACHI TOOL ENGINEERING, LTD., Tokyo (JP)

(72) Inventor: Kaname Suehara, Shiga (JP)

(73) Assignee: MITSUBISHI HITACHI TOOL ENGINEERING, LTD., Tokyo (JP)

( * ) Notice: Subject to any disclaimer, the term of this patent is extended or adjusted under 35 U.S.C. 154(b) by 0 days. days.

(21) Appl. No.: 15/521,563

(22) PCT Filed: Oct. 21, 2015

(86) PCT No.: PCT/JP2015/079641
§ 371 (c)(1),
(2) Date: Apr. 24, 2017

(87) PCT Pub. No.: WO2016/067985
PCT Pub. Date: May 6, 2016

(65) Prior Publication Data
US 2017/0304910 A1    Oct. 26, 2017

(30) Foreign Application Priority Data

Oct. 28, 2014   (JP) ................. 2014-219716
May 28, 2015   (JP) ................. 2015-108328

(51) Int. Cl.
*B23C 5/10*       (2006.01)
*B23C 5/16*       (2006.01)

(52) U.S. Cl.
CPC .................. *B23C 5/10* (2013.01); *B23C 5/16* (2013.01); *B23C 2210/54* (2013.01);
(Continued)

(58) Field of Classification Search
CPC ........ B23C 2210/54; B23C 2210/0407; B23C 2210/0485; B23C 2210/40;
(Continued)

(56) References Cited

U.S. PATENT DOCUMENTS 9,381,581 B1 *   7/2016   Zaman .................... B23C 5/10
2012/0183363 A1   7/2012   Davis et al.
(Continued)

FOREIGN PATENT DOCUMENTS

EP    0 936 014 A1    8/1999
JP    2-180517        7/1990
(Continued)

OTHER PUBLICATIONS

International Search Report dated Dec. 22, 2015 in corresponding International Application No. PCT/JP2015/079641.

*Primary Examiner* — Will Fridie, Jr.

(57) ABSTRACT

Ceramic end mill with cutting edge portion including gashes between cutting edges and adjacent in a rotation direction. Center cut edges are formed at end cutting edges close to and facing rotation axis O. Center grooves are formed on rear sides of center cut edges and end cutting edges in the rotation direction continuous with a radial direction. The center grooves are continuous with positions where end cutting edge second surfaces face or approach rotation axis O. End cutting edge second surfaces are laid between center cut edges and end cutting edges. Center grooves are formed between end cutting edge second surfaces and center cut edges positioned on a rear side of end cutting edge second surfaces in the rotation direction. The center grooves pass on rotation axis O. Center grooves double as rake faces of the respective center cut edges and are continuous with the gashes.

11 Claims, 12 Drawing Sheets

(52) U.S. Cl.
CPC ...... *B23C 2220/44* (2013.01); *B23C 2226/18* (2013.01); *B23C 2228/24* (2013.01)

(58) Field of Classification Search
CPC .......... B23C 2210/241; B23C 2210/12; B23C 2210/123; B23C 2210/126; B23C 2210/04; B23C 2220/44; B23C 5/10; B23C 5/1009; B23C 5/16
See application file for complete search history.

(56) References Cited

U.S. PATENT DOCUMENTS

| | | | | |
|---|---|---|---|---|
| 2013/0071192 | A1* | 3/2013 | Kuroda | ...................... B23C 5/10 407/54 |
| 2016/0250695 | A1* | 9/2016 | Baba | ......................... B23C 5/10 409/131 |
| 2017/0008098 | A1* | 1/2017 | Kuroda | ...................... B23C 5/10 |
| 2017/0087646 | A1* | 3/2017 | Haimer | ..................... B23C 5/10 |
| 2017/0232532 | A1* | 8/2017 | Wells | ......................... B23C 5/10 407/54 |
| 2017/0304909 | A1* | 10/2017 | Fukata | ...................... B23C 5/10 |

FOREIGN PATENT DOCUMENTS

| | | |
|---|---|---|
| JP | 2005-224898 | 8/2005 |
| JP | 2006-110683 | 4/2006 |
| JP | 2007-30074 | 2/2007 |
| JP | 2008-36722 | 2/2008 |
| JP | 2009-56587 | 3/2009 |
| JP | 2010-264592 | 11/2010 |
| WO | WO 2013/118829 A1 | 8/2013 |

\* cited by examiner

FIG.2-(a)
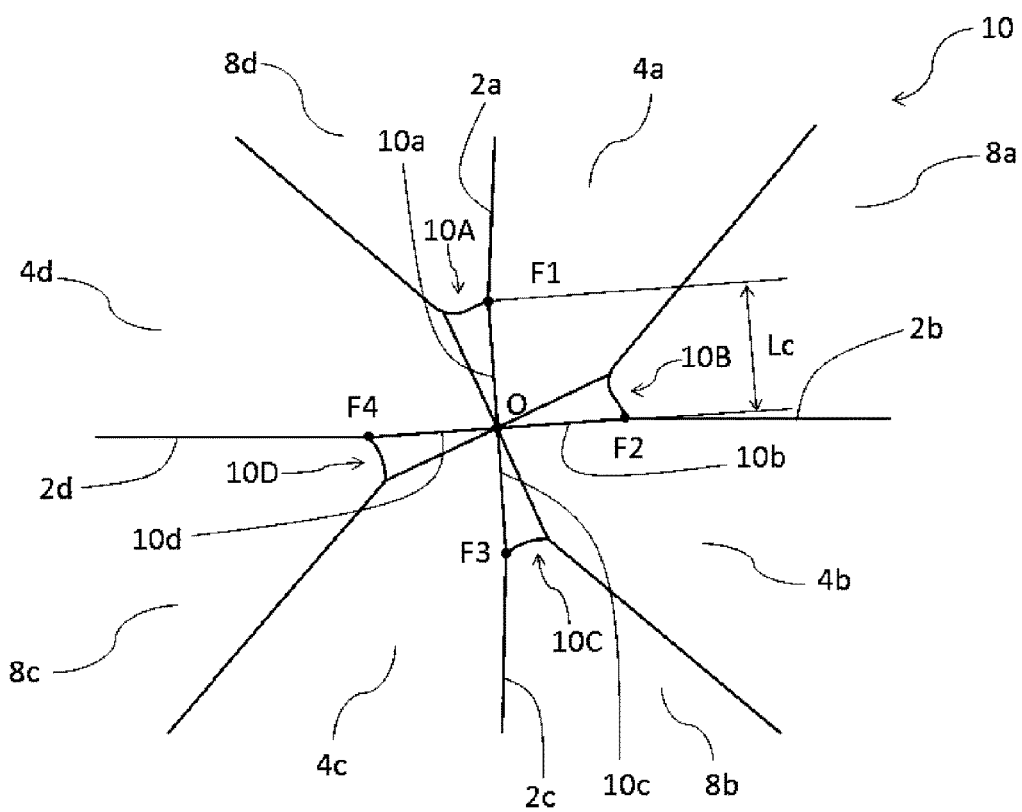

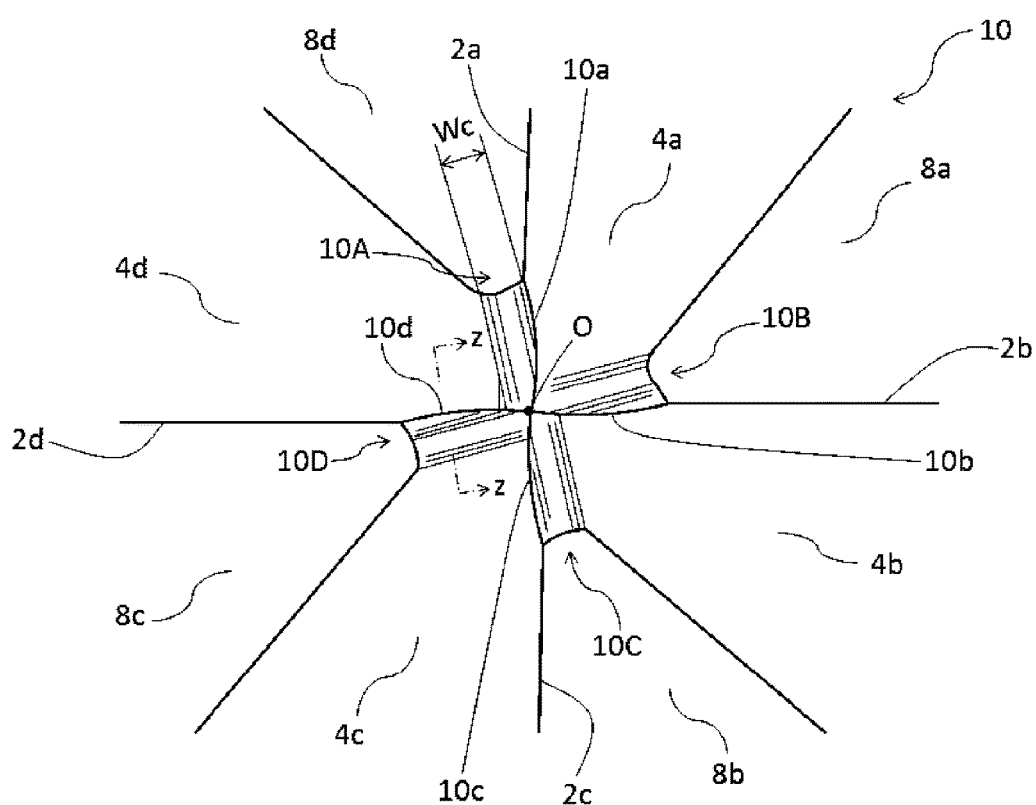
FIG.2-(b)

FIG.3
(a)
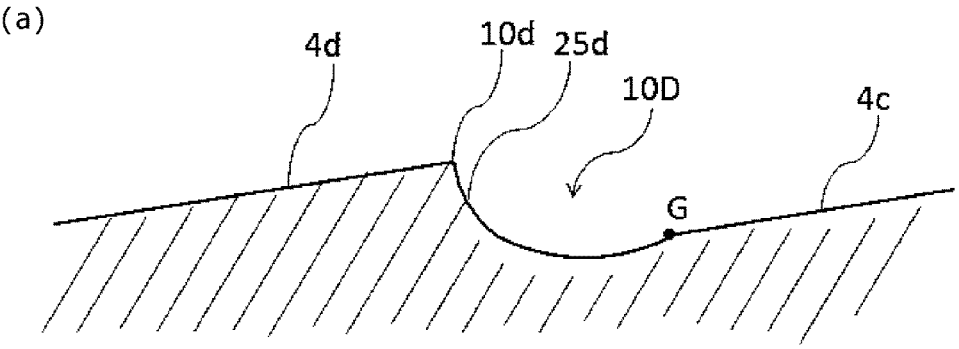
(b)
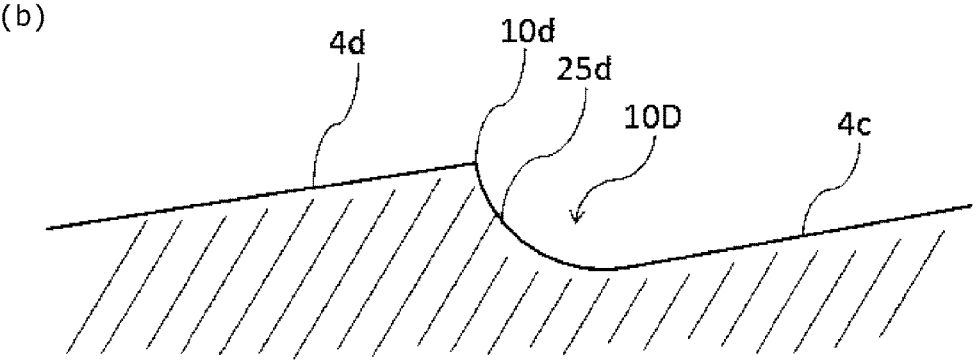

CERAMIC END MILL AND METHOD FOR CUTTING DIFFICULT-TO-CUT MATERIAL USING THE SAME

CROSS-REFERENCE TO RELATED APPLICATIONS

This application is a U.S. National Stage Application, which claims the benefit under 35 U.S.C. § 371 of PCT International Patent Application No. PCT/JP2015/079641, filed Oct. 21, 2015 which claims the foreign priority benefit under 35 U.S.C. § 119 of Japanese Patent Application No. 2014-219716, filed Oct. 28, 2014, and Japanese Patent Application No. 2015-108328, filed May 28, 2015, the contents of which are incorporated herein by reference.

TECHNICAL FIELD

The present invention relates to a radius type or a square type ceramic end mill that can cut a difficult-to-cut material such as a heat-resistant alloy at an ultrahigh speed and a method for cutting the difficult-to-cut material using the same.

BACKGROUND ART

Since a beat-resistant alloy, such as a Ti alloy and a stainless steel, which is excellent in heat resistance and lightweightness and therefore is often used as a material for a mold and a component, is a difficult-to-cut material, machining efficiency is poor in usual cutting, making it difficult to improve productivity. On the background of this difficulty, there has been developed a cutting tool made of high-hardness material such as a ceramic that allows a high speed cutting of the difficult-to-cut material (see Patent Documents 1 to 5). To ensure the cutting of the difficult-to-cut material at ultrahigh speed, which is higher than a cutting velocity for the high speed cutting, high heat resistance, wear resistance, and strength are required for a material of the cutting tool itself. However, even if the performance is provided to the material itself, cutting ability as the cutting tool fails to be sufficiently exerted is some cases.

For example, a radius end mill or a square end mill has a shape where corner radius edges close to an outer periphery in a radial direction at a distal end of a tool (end mill) or end cutting edges cut a surface of a work material first, and the cutting ability at a center portion on a tool end surface is not expected. Accordingly, the end mill is not suitable for a thrust process where the toot axially advances and a helical process where the tool spirally cuts in the work material in principle. Since a ball end mill is assumed to perform the cutting by the entire cutting edge including the center pan on the tool end surface, the cutting edges may have a configuration of passing through the center on the tool end surface (see Patent Document 6).

CITATION LIST

Patent Documents

Patent Document 1: U. S. Patent No. 2012/0183363 (paragraphs 0020 to 0026, FIG. 1A, FIG. 1B, and FIG. 4A to FIG. 7)
Patent Document 2: Japanese Unexamined Patent Application Publication No. 2-180517 (claim 1, the nineteenth line in the upper left column to the fourteenth line in the upper right column on the second page)
Patent Document 3: Japanese Unexamined Patent Application Publication No. 2006-110683 (paragraphs 0015 to 0032, FIG. 2 to FIG. 4)
Patent Document 4: Japanese Unexamined Patent Application Publication No. 2010-264592 (paragraphs 0010 to 0014, FIG. 2)
Patent Document 5: Japanese Unexamined Patent Application Publication No. 2007-30074 (paragraphs 0024 to 0032, FIG. 2, FIG. 3)
Patent Document 6: WO 2013/118829 (claim 1, FIG. 3, FIG. 5)

DISCLOSURE OF THE INVENTION

Problems to be Solved by the Invention

An end mill of Patent Document 1, which is a typical cutting tool made of high-hardness material, includes a core to secure, rigidity of the tool at a center portion on an end surface (a distal end of a cutting edge portion) side in a tool axis direction. The end mill has a shape of forming gashes continuous with swarf discharge grooves (vertical groove) between this core and respective end cutting edges. However, since the end cutting edges are not continuous to the core in a radial direction (FIG. 4, FIG. 6, and FIG. 7), a part close to the center portion on the tool end surface does not have the cutting ability. The end mill of Patent Document 1 structurally corresponds to the radius end mill.

In detail, in Patent Document 1, a gash 56a continuous with a vertical groove 24a is spirally formed at a part close to a core 48a of an end cutting edge (cutting edge) 16a (16b) (claim 1, paragraph 0026). Viewing the tool end surface of this end mill from a distal end side, the gash 56a is present between amend portion of the end cutting, edge 16a on the core 48a side and the core 48a in the radial direction. The gash 56a is concaved to a shank portion 8a side with respect to the distal end of the tool (FIG. 5 to FIG. 7). Accordingly, the end cutting edge is absent in a region between the core 48a and the end cutting edge 16a, and the elating cannot be performed at this region.

Patent Document 2 uses a ceramic poor in toughness as a material of a tool body and forms a margin on a cutting edge flank and configures flank roughness to be a certain value or less. Thus, Patent Document 2 supplements the shortage of toughness of the material to ensure a long life of the tool. However, Patent Document 2 does not mention a cutting by end cutting edges close to a center portion on a tool end surface of a radius end mill.

Patent Document 3 specifies a relationship between peripheral cutting edges and peripheral cutting edge flanks when a tool is viewed from a cross section perpendicular to a tool axis, a shape of curved surfaces from the peripheral cutting edges to deepest portions of swarf discharge moves on a front side in a rotation direction, and curved surfaces from the peripheral cutting edge flanks to the deepest portions of the swarf discharge grooves on a rear side in the rotation direction (paragraphs 0015 to 0032. FIG. 2 to FIG. 4). However, a shape of cutting edges near a center on a tool end surface is not specified.

In Patent Document 4, end cutting edges are continuous with a proximity of a center on a tool end surface. However, a part of the end cutting edge close to the center curves to a front side in a rotation direction and intersects with a boundary line between a flank of the end cutting edge positioned on the front side in the rotation direction and a gash (ridgeline portion on an end portion) (FIG. 2). Therefore, the parts of the respective end cutting edge flanks close to the center gather at the center portion on the tool end surface. Similar to Patent Document 1, since this example also forms a core, the end cutting edges are absent at the center part on the tool end surface.

In Patent Document 5, end cutting edges are continuous in one direction laid across a center portion near the center on a tool end surface (FIG. 2). However, similar to Patent Document 4, since parts close to the center of the end cutting edges are continuous with the end cutting edges on a from side in a rotation direction so as to bend in the front side in the rotation direction when the end surface is viewed from a tool axis direction, the end cutting edges do not pass through the center on the tool end surface. On an elevation surface of the tool, the parts of the end cutting edges close to the center retreat to a shank side with respect to the tool end surface (paragraph 0029, FIG. 3); therefore, the parts close to the center of the end cutting edges cannot involve cutting at a start of the cutting (paragraph 0032).

As described above, the conventional radius end mills cannot perform the cutting at the part near the center on the tool end surface or have the shapes difficult for the cutting. Consequently, the radius end mills cannot uniformly cut a work material at the entire surface of the tool end surface; therefore, it is hard to say that the radius end mills have the ability of handling the thrust process and the helical process.

From the background, the present invention proposes a ceramic end mill that secures a cutting ability at a part near a center of a tool end surface to ensure cutting the work material at an entire surface on the tool end surface and to ensure handling the thrust process or a similar process, and a method for cutting a difficult-to-cut material using the ceramic end mill.

Solutions to the Problems

A ceramic end mill of the present invention according to claim 1 is configured as follows. The ceramic end mill includes a cutting edge portion. The cutting edge portion includes a plurality of cutting edges and gashes. The plurality of cutting edges are arranged on a distal end portion side of a tool body in an axis direction spaced in a rotation direction. The gashes are formed between the cutting edges adjacent in the rotation direction. The respective cutting edges include center cut edges, end cutting edges, and peripheral cutting edges. The center cut edges are disposed from parts close to a rotation axis to an outer peripheral side in a radial direction. The center cut edges face the rotation axis. The end cutting edges are continuous with the center cut edges. The peripheral cutting edges are continuous from the end cutting edges to a tool rear end side. Respective center grooves are formed on rear sides of the center cut edges and the end cutting edges in the rotation direction continuous in the radial direction. The center grooves are continuous with positions where end cutting edge second surfaces face the rotation axis. Alternatively, the center grooves are continuous with positions where the end cutting edge second surfaces approach the rotation axis. The end cutting edge second surfaces are laid between the center cut edges and the end cutting edges. The respective center grooves are formed between the end cutting edge second surfaces and the center cut edges positioned on a rear side of the end cutting edge second surfaces in the rotation direction. The center grooves pass on the rotation axis. The center grooves double as rake faces of the respective center cut edges. The center grooves are continuous with the gashes.

"The peripheral cutting edges are continuous from the end cutting edges to a tool rear end side" is a gist that includes a square type end mill with the peripheral cutting edges directly continuous with the end cutting edges and the radius type end mill where the corner radius edges are interposed between and continuous with both the end cutting edges and the peripheral cutting edges (claim 3). "[A] tool rear end side" means a "rear end side" viewed from the cutting edge portion and means a shank portion 30 side. With the radius type, as illustrated in FIG. 1, corner radius edges 3a to 3f are continuous with an outer peripheral side of respective end cutting edges 2a to 2f in a radial direction. Respective peripheral cutting edges 13a to 13f are continuous from the corner radius edges 3a to 3f to the shank portion 30 side (claim 3). "The edges are continuous" means continuous convex ridgelines. When the edges draw a curved line, a curvature of the curved line needs not to be constant.

"[T]he center cut edges facing the rotation axis" in claim 1 means that, as, illustrated in FIG. 1 and FIG. 2-(a) and (b), when the tool (end mill) or, an end surface of a cutting edge portion 1 is viewed in a rotation axis O direction, center cut edges 10a to 10d are radially formed starting from the rotation axis O to an outer peripheral side in a radial direction, and end portions of the center cut edges 10a to 10d close to the rotation axis O front onto the rotation axis O. Note that, a formation of center grooves 10A to 10D, which pass through the rotation axis O, on the tool end surface forms the center cut edges 10a to 10d as the edges (convex ridgelines) on a rear side of the center grooves 10A to 10D in the rotation direction. Strictly speaking, due to the presence of the center grooves 10A to 10D on the rotation axis O, the center cut edges 10a to 10d are formed from the rotation axis O to gashes 8 and 9 so as to face the center grooves 10A to 10D. As details will be described later, while the gashes 14 and 9 are constituted of the first gashes 8, which are positioned on a center side in the radial direction, and the second gashes 9, which are continuous with an outer peripheral side of the first gashes 8 in the radial direction, the gashes according to claim 1 mean the first gashes 8. The center grooves 10A to 10D are formed into strip shapes radially formed from the rotation axis O (FIG. 2-(a)) or strip shapes with approximately uniform with (FIG. 2-(b)) by the number of cutting edges.

"[T]he center grooves 10A to 10D doubling as rake faces of the respective center cut edges 10a to 10d" in claim 1 means that the center grooves 10A to 10D have the (center cut edge) rake faces formed into a concave shape on a front side of the respective center cut edges 10a to 10d in the rotation direction. Specifically, as illustrated in FIG. 3-(b), this includes the case where the center grooves 10A to 10D are configured of only (center cut edge) rake faces 25d and the case where the center grooves 10A to 10D include the (center cut edge) rake faces, and curved surfaces and planar surfaces following (continuous with) end cutting edge second surfaces 4a to 4d on the front side in the rotation direction of the (center cut edge) rake faces. Besides, as illustrated in FIG. 3-(a), there is a case where the center grooves 10A to 10D include the (center cut edge) rake faces 25d, which are formed into a concave groove shape concaved in the rotation axis O direction, between the end cutting edge second surfaces 4a-4b (4b-4c, 4c-4d, and 4d-4a) adjacent to one another in the rotation direction. FIG. 3-(a) and (b) illustrate a cross section taken along a line FIG. 2-(b).

In the case of FIG. 3-(a), the formation of the center grooves 10A to 10D into the concave groove shape may configure the center grooves 10A to 10D and a front side of the end cutting edge second surfaces 4a to 4d in the rotation direction so as to have discontinuous surfaces. Accordingly, a boundary line indicated by G may appear between the center grooves 10A to 10D and the end cutting edge second surfaces 4a to 4d. In the case of FIG. 3-(b), the rake faces 25d, which constitute the center grooves 10A to 10D, and the front side of the end cutting edge second surfaces 4a to 4d in the rotation direction can be formed as continuous surfaces and therefore the boundary line does not always appear. The "grooves" of the center grooves 10A to 10D do not always mean the groove shape concaved from the tool end surface in the rotation axis O direction. As illustrated in FIG. 3-(a) and (b), the "grooves" include the grooves with a shape concaved from the end cutting edge second surfaces 4a to 4d side to the rear side in the rotation direction.

The respective center grooves 10A to 10D are formed between the end cutting edge second surfaces 4a to 4d and the center cut edges 10a to 10d, which are positioned on the rear side in the rotation direction. Accordingly, the respective center grooves 10A to 10D partition parts of the end cutting edge second surfaces 4a to 4d close to the rotation axis O with the center cut edges 10a to 10d on the rear side in the rotation direction. That is the center grooves 10A to 10D on the rear side of the parts of the end cutting edge second surfaces 4a to 4d close to the rotation axis O in the rotation direction partition the end cutting edge second surfaces 4a to 4d with the center cut edges 10a to 10d. Consequently, as illustrated in FIG. 2-(a) and (b), the center grooves 10A to 10D are formed on the front side and the rear side of the parts of the end cutting edge second surfaces 4a to 4d close to the rotation axis O in the rotation direction. At the parts near the rotation axis O, the center grooves 10A to 10D and the end cutting edge second surfaces 4a to 4d are arranged in alternation in the rotation direction (circumferential direction) of the rotation axis O.

Since the center cut edges 10a to 10d are formed simultaneously with formation (grinding) of the center grooves 10A to 10D on the tool end surface, a shape of the center cut edges 10a to 10d is determined according to a planar shape of the center grooves 10A to 10D viewed from the end surface side of the tool. In FIG. 1 and FIG. 2-(a), when the tool is viewed from the end surface side, the center cut edges 10a to 10d form a straight line or a straight-line-like shape. However, the center cut edges 10a to 10d may draw a curved line as illustrated in FIG. 2-(b).

As illustrated in FIG. 1 and FIG. 2-(a), when the end surface of the cutting edge portion 1 is viewed in the rotation axis O direction, there may be a case where the center grooves 10A to 10D are formed to gradually widen from the rotation axis O to the first gashes 8 to have an enlarging shape or the case where, as illustrated in FIG. 2-(b), the center grooves 10A to 10D are formed into strip shapes with a uniform or gradually changing width Wc from the rotation axis O to the first gashes 8 (claim 2).

"[U]niform width" means that, among the center grooves 10A to 10D, regions including the rotation axis O have the width of certain size or more to the extent that swarfs cut by the center cut edges 10a to 10d can be discharged to the first gashes 8. This means that the width is substantially or approximately uniform from the rotation axis O to the first gashes 8. "[A] gradually changing width" means that, as illustrated in FIG. 2-(b), although the width Wc of the center grooves 10A to 10D is not distinctly uniform in the radial direction, an extent of a change in width is gradual and therefore it can be said that the dischargeability of swarfs is uniformly equivalent in the radial direction. In any cases, it is only necessary that, in claim 1 including claim 2, the center grooves 10A to 10D have at least the width with the certain size or more in an overall length in the radial direction, a region including the rotation axis O contain, or a region close to the rotation axis O. In view of this, the center grooves 10A to 10D include the center grooves 10A to 10D with a shape similar to FIG. 2-(a) where the center grooves 10A to 10D have the gradually enlarging width from the rotation axis O to the first gashes 8, a shape with widths of respective portions different in the radial direction, or conversely, a shape with gradually enlarging width from the first gashes 8 to the rotation axis O. In FIG. 2-(b), the width Wc of the center grooves 10A to 10D is slightly enlarged from the rotation axis O to the first gashes 8.

As illustrated in FIG. 2-(b), assume that the center grooves 10A to 10D are formed to have the uniform or gradually changing width Wc from the rotation axis O to the first gashes 8 (claim 2). With a comparison with the center grooves 10A to 10D with the gradually enlarging width from rotation axis O to the first gashes 8 (FIG. 2-(a)), an ability that the center grooves 10A to 10D house the swarfs cut by the center cut edges 10a to 10d is enhanced. This is advantageous of improvement in the dischargeability of swarfs from the center grooves 10A to 10D through the gashes 8 and 9, which are continuous with the center grooves 10A to 10D.

As described above, the respective end cutting edge second surfaces (end cutting edge flanks) 4a to 4d are formed on the rear sides of the center cut edges 10a to 10d and the end cutting edges 2a to 2d, which are continuous in the radial direction, in the rotation direction. The end cutting edge second surfaces (end cutting edge flanks) 4a to 4d are laid between the center cut edges 10a to 10d and the end cutting edges 2a to 2d. Here, "being continuous with positions where end cutting edge second surfaces 4a to 4d face the rotation axis O" in claim 1 means that, similar to the center cut edges 10a to 10d facing the rotation axis O, as illustrated in FIG. 2-(a), the parts of the end cutting edge second surfaces 4a to 4d close to the rotation axis O face the rotation axis O and front onto the rotation axis O. Since the center grooves 10A to 10D are present on the rotation axis O, strictly speaking, the end cutting edge second surfaces 4a to 4d face the rotation axis O via the center grooves 10A to 10D.

"[B]eing continuous with positions where the end cutting edge second surfaces 4a to 4d approach the rotation axis O" in claim 1 means that, as illustrated in FIG. 2-(b), when the center grooves 10A to 10F are formed into the strip shapes, the parts of the end cutting edge second surfaces 4a to 4d close to the rotation axis O are formed up to the positions near the rotation axis O and face the rotation axis O via the center grooves 10A to 10F. "[T]he parts of the end cutting edge second surfaces 4a to 4d close to the rotation axis O" means regions in contact with the center grooves the center grooves 10A to 10D at the front side and the rear side in the rotation direction. With the example illustrated in FIG. 2-(a), this means a state of possibly in contact with the rotation axis O at a center side in the radial direction.

Edges at the front side of the parts of the end cutting edge second surfaces 4a to 4d close to the rotation, axis O in the rotation direction and edges on the rear side in the rotation direction both formally become boundaries with the center grooves 10A to 10D. The edges at the front side of the pans of the end cutting edge second surfaces 4a to 4d close to the rotation axis O in the rotation direction are the center cut edges 10a to 10d. Therefore, the edges become the convex ridgelines and the boundary lines clearly appear. Note that, since the edges on the rear side in the rotation direction are not the cutting edges, as described above, the boundary lines do not always clearly appear as the convex ridgelines. As illustrated in FIG. 2-(b) and FIG. 3-(a), the end cutting edge second surfaces 4a to 4d are continuous with the center grooves 10A to 10D through the curved surfaces or, as illustrated in FIG. 3-(b), are continuous with the center grooves 10A to 10D through the planar surfaces and the curved surfaces is some cases.

As illustrated in FIG. 3-(b), "the end cutting edge second surfaces 4a to 4d are continuous with the center grooves 10A to 10D through the planar surfaces and the curved surfaces" means that, when the parts of the respective end cutting edge second surfaces 4a to 4d close to the rotation axis O are viewed to the center side as the radial direction, a curvature gradually increases from 0 from parts of the end cutting edge second surfaces 4a to 4d close to the rear side in the rotation direction to the center grooves 10A to 10D and continuously changes to cause the end cutting edge second surfaces 4a to 4d to transition to the center grooves 10A to 10D while the end cutting edge second surfaces 4a to 4d are continuous from the planar surfaces to the curved surfaces. In this case, the clear boundary lines do not appear at the pans at which the end cutting edge second surfaces 4a to 4d transition to the center grooves 10A to 10D. The center grooves 10A to 10D are configured from the center cut edge rake faces 25d, which are continuous with the center cut edges 10a to 10d, or from the transition surfaces from the center cut edge rake faces 25d to the end cutting edge second surfaces 4a to 4d. In FIG. 20), thin lines in the center grooves 10A to 10D show that the surfaces of the center grooves 10A to 10D form the concave curved surfaces.

As illustrated in FIG. 1, the end cutting edges 2a to 2d are continuous with the outer peripheral side of the center cut edges 10a to 10d, which are the edges of the end cutting edge second surfaces 4a to 4d close to the rotation axis O on the front side in the rotation direction, in the radial direction. The convex ridgelines, which become the boundary lines with first gash surfaces 8a to 8d constituting the first gashes 8, are continuous with the outer peripheral side of the edges, which are on the rear side of the end cutting edge second surfaces 4a to 4d in the rotation direction, in the radial direction.

As described above, at the periphery of the rotation axis O, the center grooves 10A to 10D are formed on the front side and the rear side of the parts of the end cutting edge second surfaces 4a to 4d in the rotation direction close to the rotation axis O. The parts of the respective end cutting edge second surfaces 4a to 4d close to the rotation axis O partitioned by the edges on the front side in the rotation direction (center cut edges 10a to 10d) and the ethics on the rear side in the rotation direction (boundaries with the center grooves 10A to 10D) collect at the peripheral area of the rotation axis O. This becomes the regions with a certain area at the peripheral area of the rotation axis O (center cut edge portion 10). Here, the parts of the end cubing edge second surfaces 4a to 4d close to the rotation axis O means the regions with imaginary triangular shape or fan shape interposed between the boundaries between the center cut edges 10a to 10d on the front side in the rotation direction and the center grooves 10A to 10D on the rear side. The parts of the end cutting edge second surfaces 4a to 4d close to the rotation axis O remain on the end surface of the tool at the formation the center grooves 10A to 10D on the tool end surface. Accordingly, the collection at the peripheral area of the rotation axis O structurally forms the shape equivalent to the formation of a core on the center portion of the tool substantially similar to Patent Document 1, contributing to securing rigidity of the tool.

For example, while Patent Document 1 leaves a core close to a rotation axis on a tool end surface, trashes 56a, which are deeply cut in from end cutting edge flanks to end cutting edge rake faces on a rear side in a rotation direction in a section from the vicinity of intermediate portions of end cutting edges in a radial direction to the core. Accordingly, with a comparison with the end cutting edges continuous with the core, rigidity of respective cutting edges are sacrificed, thereby deteriorating the rigidity. In contrast to this, with the end mill of the present invention, the first gashes 8 are formed from the positions on the outer peripheral side of the parts of the end cutting edge second surfaces 4a to 4d close to the rotation axis O in the rotation direction (intersection points of the boundary lines between the end cutting edge second surfaces 4a to 1d and end cutting edge third surfaces 6a to of with the first gash surfaces 8a to 8f) to end cutting edge rake faces 11a to 11d on the rear side in the rotation direction. Consequently, with the present invention, the parts of the end cutting edge second surfaces (end cutting edge flanks) 4a to 4d close to the rotation axis O are not deeply cut in from the outer peripheral side in the radial direction from and remain. With the comparison with Patent Document 1, the rigidity of the respective cutting edge and the rigidity of the tool (end mill) itself are enhanced.

Meanwhile, at the parts of the tool end surface close to, the rotation axis O, the center cut edges to 10a to 10d are formed so as to face the center grooves 10A to 10D passing on the rotation axis O. The end cutting edges 2a to 2d are continuous with the outer peripheral side of the center cut edges 10a to 10d in the radial direction. This provides the tool with the cutting ability continuously from the rotation axis O to the outer peripheral side in the radial direction on the end surface on the cutting side. That is, the tool has the ability to uniformly cut the work material by the entire tool end surface of the tool. Consequently, as described above, while the end mill has the configuration equivalent to the cutting edge portion 1 of the tool with the core, the end mill secures an ability of handling a thrust process and a helical process, which ensure the cutting at the center portion.

The respective center cut edges 10a to 10d, which cut the work material by the center part on the tool end surface, face the center grooves 10A to 10D passing on the rotation axis O. Accordingly, the cutting edge portion 1 secures a discharge path to radially discharge the mails cut by the center cut edges 10a to 10d from the rotation axis O through the center grooves 10A to 10D. The center grooves 10A to 10D are continuous with the first gashes 8 in the radial direction. Therefore, the swarfs entering into the center grooves 10A to 10D are discharged to the flutes 20a to 20d as the swarf discharge grooves, which are formed between the peripheral cutting, edges 13a to 13d adjacent in the rotation direction, through the first gashes 8.

The center grooves 10A to 10D serve as the discharge paths for the swarfs cut by the center cut edges 10a to 10d, and the first gashes 8 and the flutes 20a to 20d are continuous with the center grooves 10A to 10D. This avoids a clogging of the swarfs in the center grooves 10A to 10D, also avoiding a situation where the cutting ability of the center cut edges 10a to 10d is deteriorated during the thrust process and the helical process.

The first gash surfaces 8a to 8d, which constitute the first gashes 8, are continuous with the rear side of parts of the end cutting edge second surfaces 4a to 4d in the rotation direction close to the rotation axis O. The second gash surfaces 9a to 9d, which constitute the second gashes 9, are continuous with the outer peripheral side of the first gash surfaces 8a to 8d in the radial direction. The first gashes 8 are constituted of the first gash surfaces 8a to 8d and the end cutting edge rake faces 11a to 11d. The second gashes 9 are constituted of the second gash surfaces 9a to 9d and the end cutting edge rake faces 11a to 11d. (Spaces of) the first gashes 8 are continuous with (spaces of) the above-described flutes 20a to 20d. "[S]urfaces are continuous" means that the continuous surfaces form surfaces different from one another and are adjacent to one another interposing a convex or concave ridgeline (boundary line).

End cutting edge third surfaces 6a to 6f are continuous with the rear side of parts close to the outer periphery in the radial direction of the end cutting edge second surfaces 4a to 4f in the rotation direction. The second gash surfaces 9a to 9f are continuous with the rear side of the end cutting edge third surfaces (a to 6f in the rotation direction. The first gash surfaces 8a to 8d are continuous with the inner peripheral side of the second gash surfaces 9a to 9d in the radial direction. With the radius type illustrated in the drawing (claim 3), as illustrated in FIG. 1, corner radius edge second surfaces 5a to 5d are continuous with the rear side of the corner radius edges 3a to 3d in the rotation direction and corner radius edge third surfaces 7a to 7d are continuous with the rear side of the corner radius edge second surfaces 5a to 5f in the rotation direction. The corner radius edge third surfaces 7a to 7d are continuous with the outer peripheral side of the end cutting edge third surfaces 6a to 6d in the radial direction.

As illustrated in FIG. 4, a concave slope angle (end cutting edge concavity angle) α may be provided to the end cutting edges 2a to 2d (claim 4). In this case, when a cross section of cutting the tool at a cut line in the axis direction passing through the rotation axis O or the side surface of the tool is viewed in the radial direction, parts of the end cutting edges 2a to 2d close to the outer periphery in the radial direction protect from the center cut edges 10a to 10d to a tool distal end side. In view of this, when the tool performs the thrust process and the helical process, the center cut edges 10a to 10d contact and cut the surface of the work material delayed from the end cutting edges 2a to 2d. Accordingly, as a result of forming a cutting edge 1A (the center cut edges 10a to 10d and the end cutting edges 2a to 2d) continuous from the rotation axis O to the outer periphery in the radial direction, a resistance that the tool receives from the work material at the start of the cutting (torsional moment) decreases while the entire tool end surface has the cutting ability. This allows preventing the breakage of the tool in advance.

The ceramic end mill according to any one of claim 1 to claim 5, which is the cutting tool made of a high-hardness material, cuts a difficult-to-cut material at an ultrahigh speed, a cutting velocity Vc of 500 m/min to 1200 m/min (claim 6). In association with the cutting, this possibly causes abrasion on the cutting edge portion 1 at the distal end portion of the cutting tool. However, as long as the progress of the abrasion is within around 10 percent, of the tool diameter, the remaining part from the end cutting edges 2a to 2f to the corner radius edges 3a to 3f of the cutting edges 1A after the abrasion can still function as the cutting edges 1A, thus having a feature of ensuring maintaining the cutting ability. Although an appropriate or preferable range of the cutting velocity Vc is 500 m/min to 1200 m/min, it is only necessary that a lowest speed is 300 m/min or more at the slowest.

This ability that the remaining part after the abrasion can function as the cutting edges 1A remarkably appears specifically when a silicon nitride-based ceramic, especially SiAlON is used as the base material of the tool (claim 5). As the base material of the tool, it is especially suitable to use a sintered body containing at least any one of a magnesium and a magnesium compound together with an RE element compound (Note that, the RE is at least one kind of elements of a rare earth element). The selection of these materials allows obtaining excellent wear resistance, heat resistance, and strength even when the tool of the present invention performs the cutting work on the difficult-to-cut material at a high feed.

Coating a hard film (for example, TiSiN, TiAlN, TiAlSiN, CrN, CrSiN, AlCrN, AlCrSiN, AlTiCrN, or AlCrVBN) on the cutting edge portion of the end mill of the present invention as necessary allows further improving tool performance.

Effects of the Invention

The respective cutting edges include the center cut edges and the end cutting edges continuous with the center cut edges. The center cut edges are disposed from the parts close to the rotation axis to the outer peripheral side in the radial direction and face the rotation axis. The end cutting edge second surfaces are positioned on the rear sides of the center cut edges and the end cutting edges in the rotation direction. The end cutting edge second surfaces are continuous with the positions facing the rotation axis or the positions approaching the rotation axis. The center grooves are formed between the end cutting edge second surfaces and the center cut edges on the rear side in the rotation direction. The center grooves pass on the rotation axis and partition the end cutting edge second surfaces with the center cut edges. This allows the center cut edges to be formed so as to face the center grooves passing on the rotation axis at the parts close to the rotation axis on the tool end surface. This ensures providing the end mill with the cutting ability continuously from the rotation axis to the outer peripheral side in the radial direction on the end surface on the cutting side.

Consequently, the end mill has the ability to uniformly cut the work material by the entire tool end surface. Therefore, while the end mill has the configuration equivalent to the cutting edge portion of the tool with the core, the end mill can secure an ability of handling the thrust process and the helical process, which ensure the cutting in the center portion.

BRIEF DESCRIPTION OF THE DRAWINGS

FIG. 2-(a) is an enlarged view near a rotation axis of FIG. 1 in the case where center grooves are thrilled into a fan shape.

FIG. 2-(b) is an enlarged view near the rotation axis of FIG. 1 in the case where the center grooves are formed to be radially uniform or formed to be a shape with gradually changing width.

FIG. 3(a) is a cross-sectional view taken along a line in FIG. 2-(b) illustrating a formation example of the center groove in the case where a center cut edge includes a rake face and is formed into a concave groove when a tool end surface is viewed in a rotation axis direction. FIG. 3(b) is a cross-sectional view taken along the line z-z in FIG. 2-(b)

illustrating a formation example of the center groove in the case where the center cut edge is formed of a center cut edge rake face, a curved surface, and a planar surface continuous with an end cutting edge second surface on a front side of the center cut edge rake face in a rotation direction.

Figure 1:
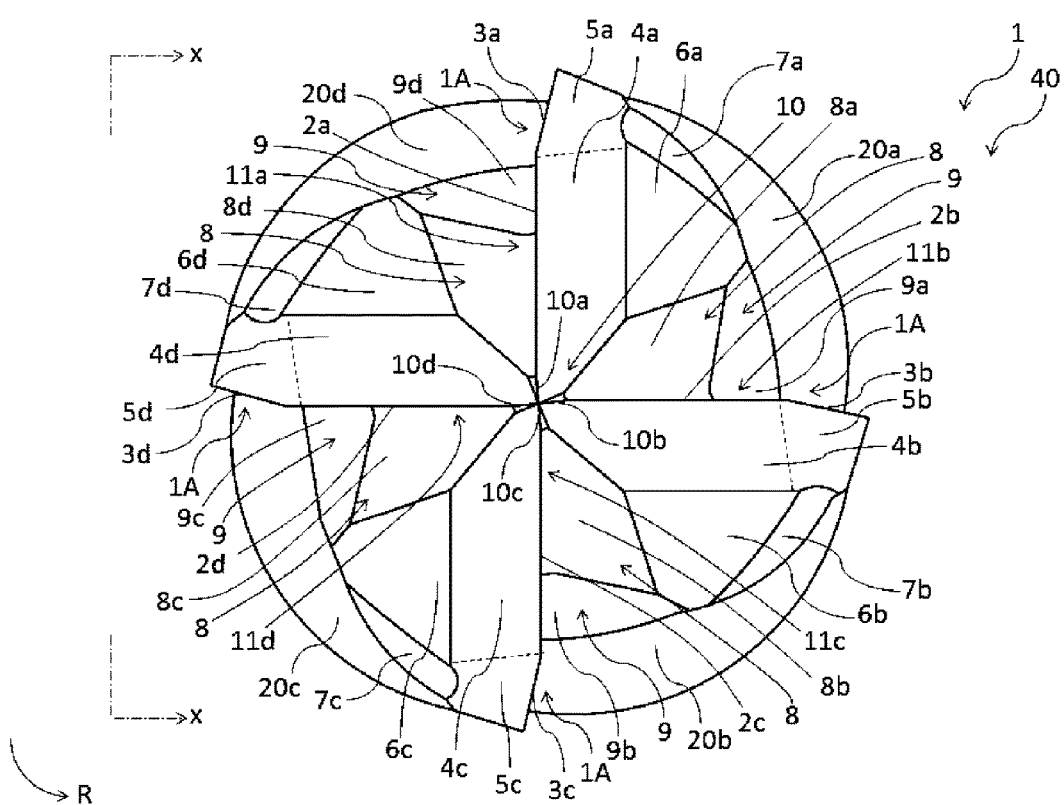
FIG. 1 is an end surface view illustrating an end surface of a (radius) end mill on a cutting edge portion side with four cutting edges.
Figure 4:
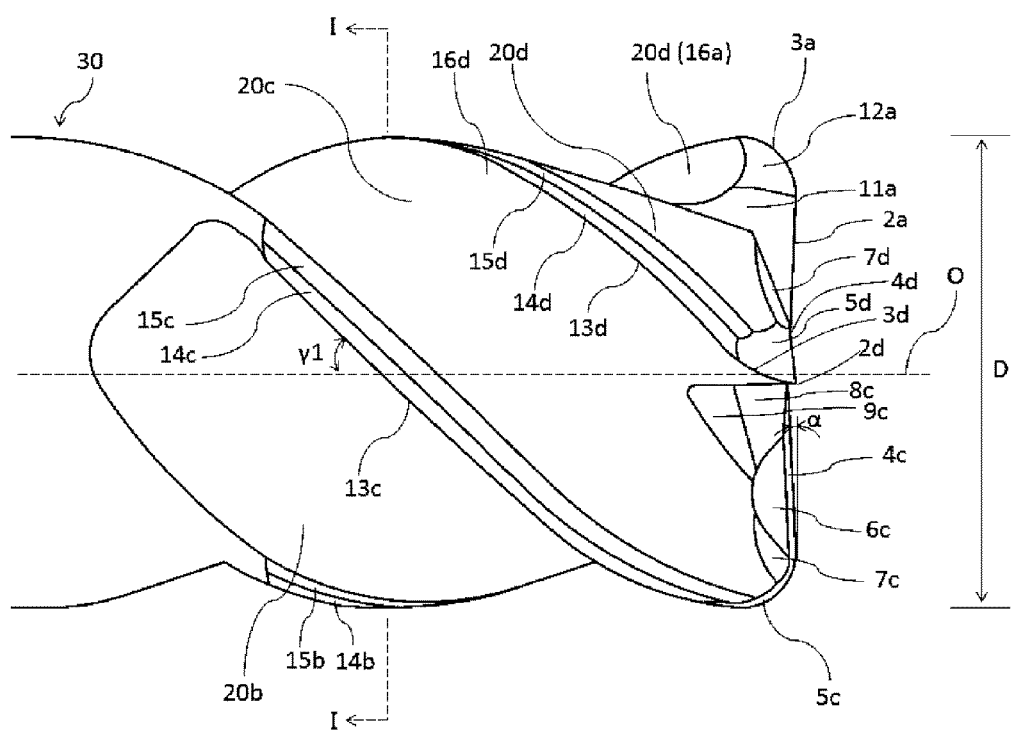

FIG. 4 is a side view of FIG. 1 and an arrow view viewed from a line x-x.

Figure 5:
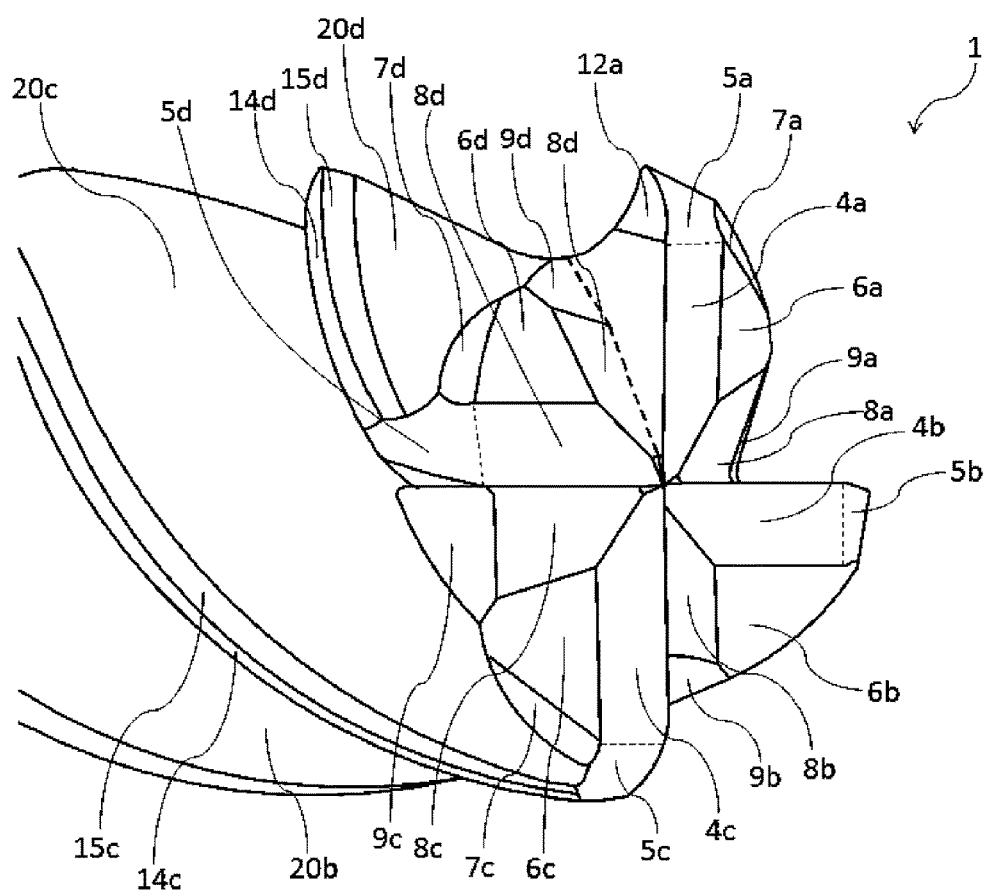

FIG. 5 is a perspective view illustrating a state of viewing FIG. 4 from slightly end surface side.

Figure 6:
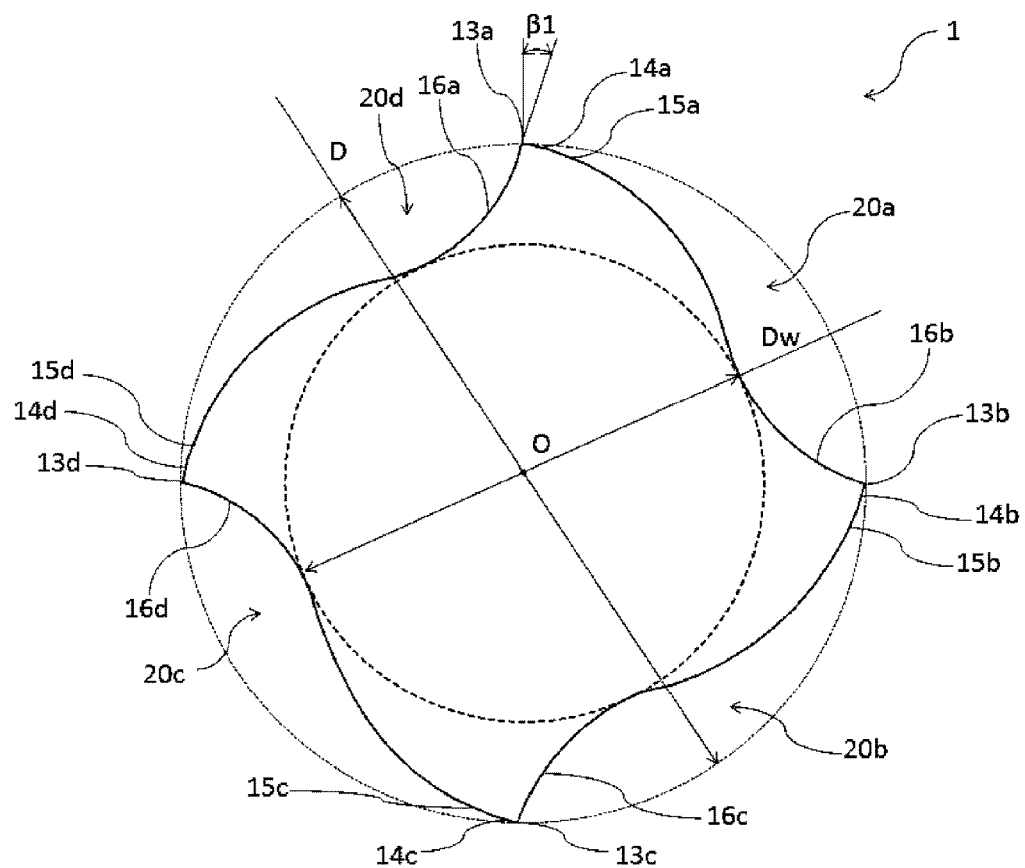

FIG. 6 is a cross-sectional view taken along a line I-I in FIG. 4 illustrating a relationship between a core diameter Dw and a tool diameter D of the end mill and a state of a peripheral cutting edge rake angle.

Figure 7:
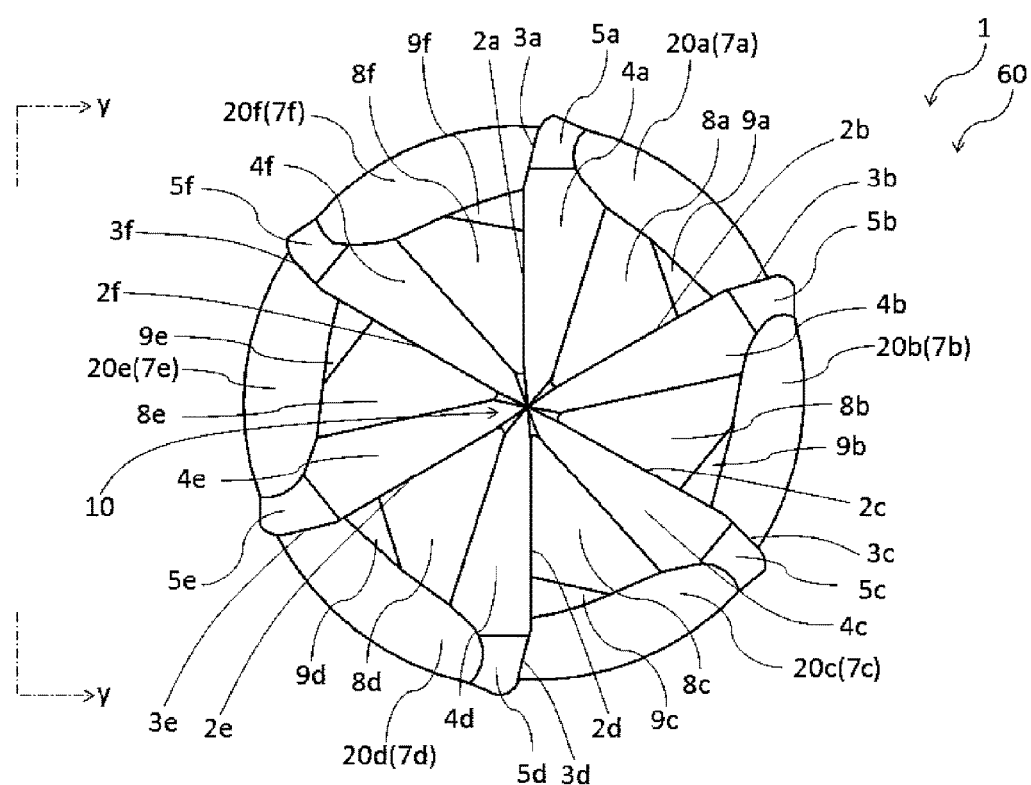

FIG. 7 is an end surface view illustrating the end surface of the (radius) end mill on the cutting edge portion side with the six cutting edges.

Figure 8:
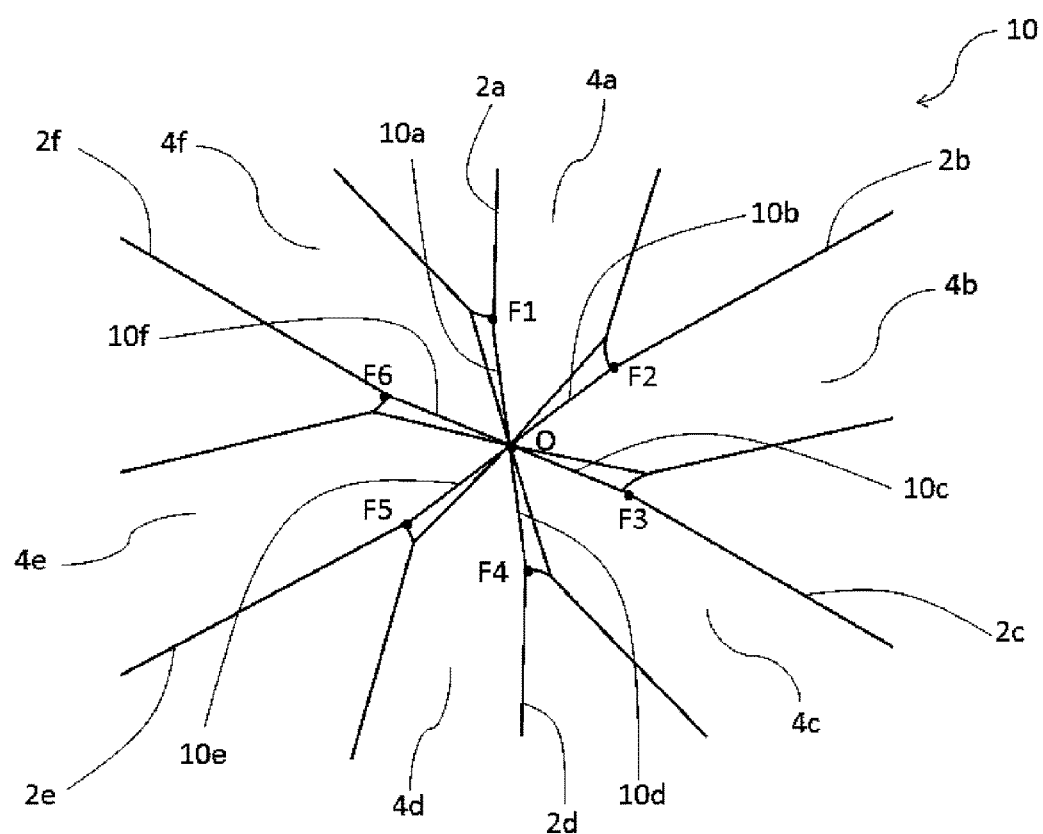

FIG. 8 is an enlarged view near the rotation axis of FIG. 7.

Figure 9:
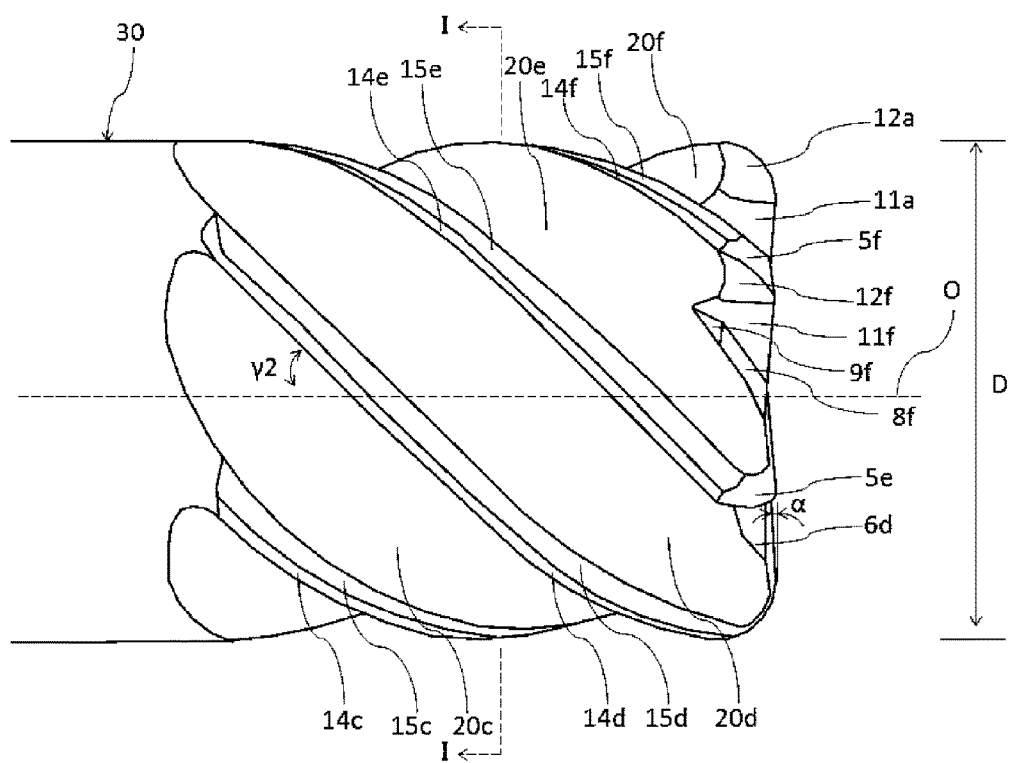

FIG. 9 is a side view of FIG. 7 and an arrow view viewed from a line y-y.

Figure 10:
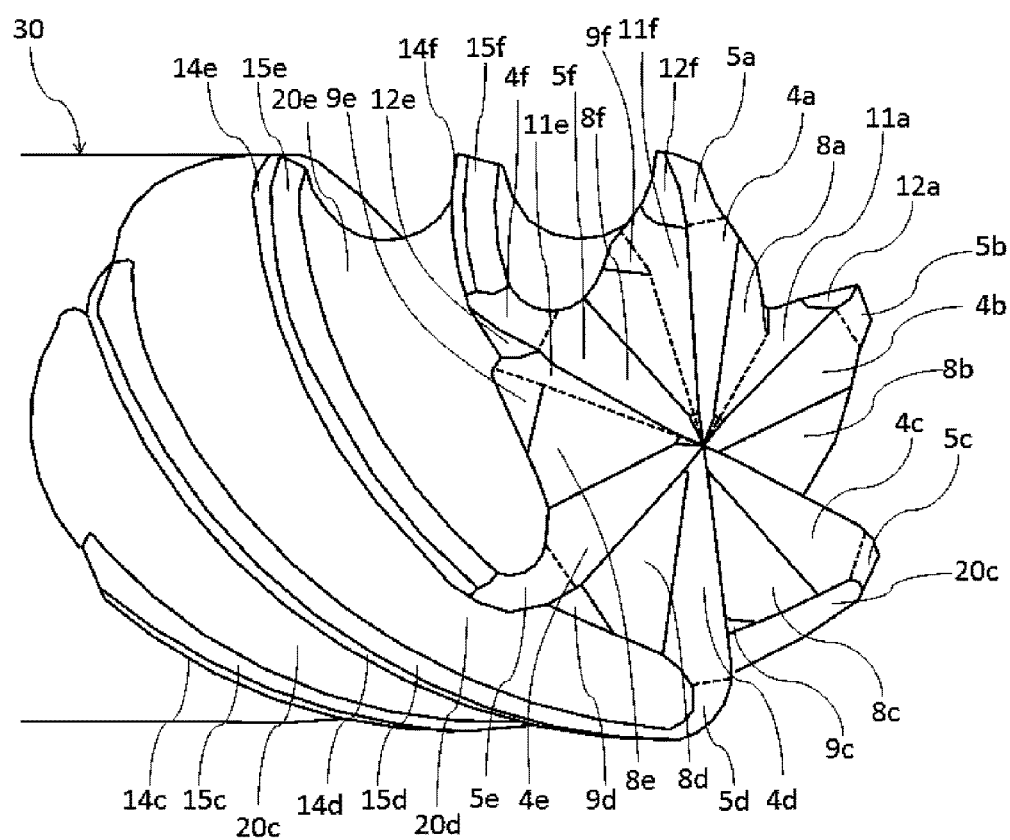

FIG. 10 is a perspective view illustrating a state of viewing FIG. 9 from slightly end surface side.

Figure 11:
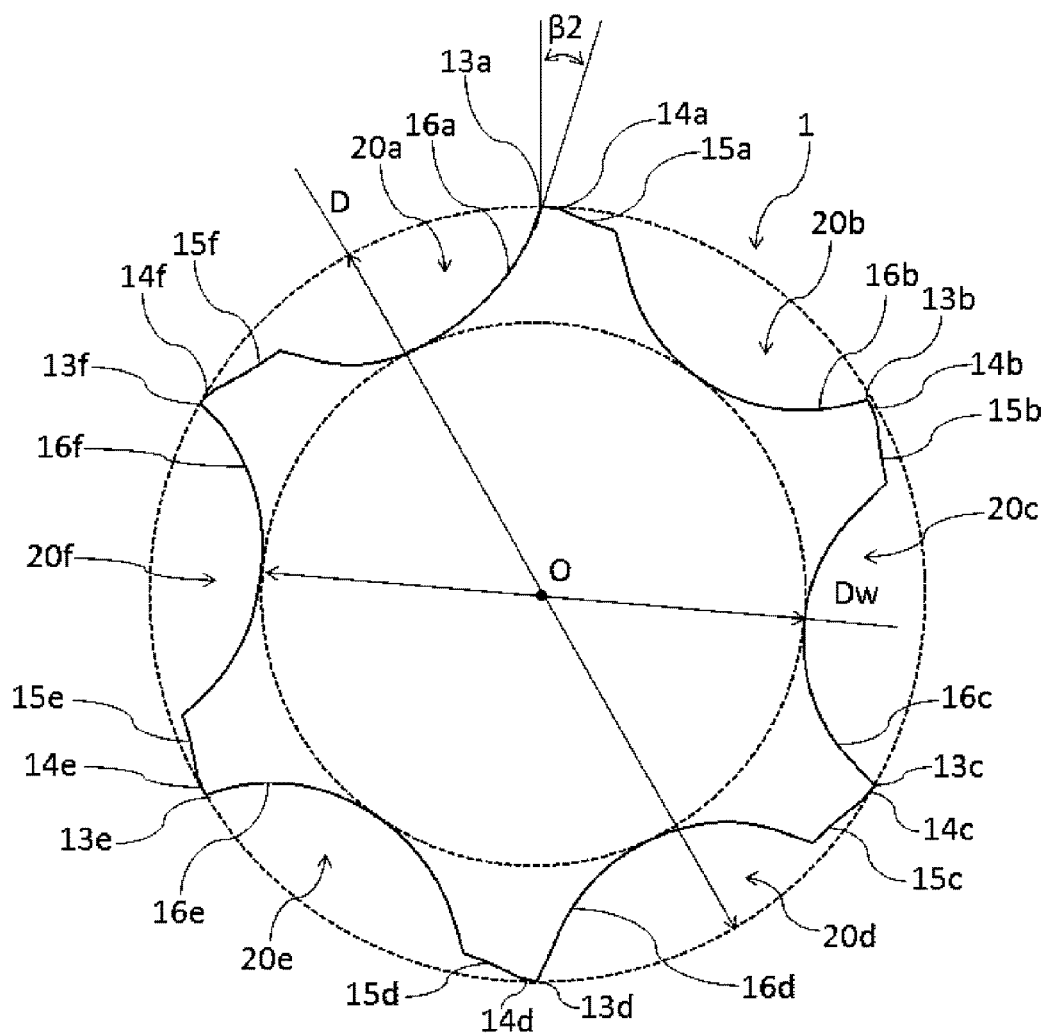

FIG. 11 is a cross-sectional view taken along a line I-I in FIG. 9 illustrating a relationship between the core diameter Dw and the tool diameter D of the end mill and a state of the peripheral cutting edge rake angle.

DESCRIPTION OF PREFERRED EMBODIMENTS

FIG. 1 illustrates an end surface of a four-flute radius type ceramic end mill (hereinafter referred to as an end mill (also referred to as a tool)) 40 that includes a plurality of cutting edges 1A, a column-shaped shank portion 30, and a cutting edge portion 1. The cutting edges 1A are arranged on a distal end portion side of a tool body in an axis direction spaced in a rotation direction. The shank portion 30 is formed on a rear end portion side of the tool body in the axis direction. The cutting edge portion 1 includes gashes 8 and 9 formed between the cutting edges 1A and 1A adjacent in the rotation direction.

The cutting edges 1A each include center cut edges 10a 10f, which face a rotation axis O, end cutting edges 2a to 2f continuous with the center cut edges 10a to 10f, and peripheral cutting edges 13a to 13f, which are continuous from the end cutting edges 2a to 2f to a rear end (the shank portion 30) side of to tool, from parts close to the rotation axis O to an outer peripheral side in the radial direction. The drawings illustrate an example of the radius type end mill 40 where corner radius edges 3a to 3f are continuous with the outer peripheral side of the respective end cutting edges 2a to 2f in the radial direction, and as illustrated in FIG. 4, the peripheral cutting edges 13a to 13f are continuous from the respective corner radius edges 3a to 3f to the tool rear end side. Note that, the end mill 40 may be a square type absent of the corner radius edges 3a to 3f. For example, e and f of the center cut edges 10a to 10f are reference numerals in the case of the six cutting edges 1A (FIG. 7 to FIG. 11), and reference numerals for the four cutting edges 1A (FIG. 1 to FIG. 6) are a to d.

As illustrated in FIG. 4, peripheral cutting edge second surfaces 14a to 14f are formed on a rear side of the respective peripheral cutting edges 13a to 13f in the rotation direction. Peripheral cutting edge third surfaces 15a to 15f are formed on the rear side of the peripheral cutting edge second surfaces 14a to 14f in the rotation direction. The peripheral cutting edge second surfaces 14a to 14d are preferably convex toward the outer peripheral side in the radial direction (eccentric tooth shape). The peripheral cutting edge third surfaces 15a to 15d are preferably concave toward the outer peripheral side in the radial direction (concave tooth shape). The peripheral cutting edge second surfaces 14a to 14d with the convex shape enhance rigidity of cutting edges of the peripheral cutting edges 13a to 13f. The peripheral cutting edge third surfaces 15a to 15d with concave shape reduce a resistance occurred in the cutting edges during the cutting, reducing a progress of abrasion.

End cutting edge second surfaces (end cutting edge flanks) 4a to 4f are formed on a rear side of the respective center cut edges 10a to 10f and the respective end cutting edges 2a to 2f, which are continuous in the radial direction, in the rotation direction. As illustrated in FIG. 1 and FIG. 2-(a), the end cutting edge second surfaces 4a to 4f are laid between the respective continuous center cut edges 10a to 10f and end cutting edges 2a to 2f and are continuous up to positions facing the rotation axis O or positions approaching the rotation axis O as illustrated in FIG. 2-(b). Center grooves 10A to 10F are formed between the respective end cutting edge second surfaces 4a to 4f and the respective center cuts edges 10a to 10f, which are positioned on the rear side in the rotation direction. As illustrated in FIG. 2-(a) and (b), the center grooves 10A to 10F pass on the rotation axis O, double as rake faces of the respective center cut edges 10a to 10f, and are continuous with the gashes 8 and 9. The center cut edges 10a to 10f are each formed at the rear side of the center grooves 10A to 10F, in the rotation direction. As a result of forming the center grooves 10A to 10F, the center cut edges 10a to 10f are formed as convex ridgelines. There may be case where the end cutting edge second surfaces 4a to 4f have a planar surface and a curved surface. Although the center 10A to 10F do not have clear boundaries with the end cutting edge second surfaces 4a to 4f, which are disposed on the front side in the rotation direction, in some cases (FIG. 3-(b)), the respective center grooves 10A to 10F formally partition the end cutting edge second surfaces 4a to 4f and the center cut edges 10a to 10f.

Surfaces of the center grooves 10A to 10F which are continuous with the front side of respective center cut edges 10a to 10f in the rotation direction, on the center cut edges 10a to 10f side become center cut edge rake faces (25d). Surfaces continuous with the rear side of the center cut edges 10a to 10f in the rotation direction become center cut edge second surfaces (center cut edge flanks). However, the end cutting edges 2a to 2f are continuous with the outer peripheral side of the center cut edges 10a to 10f in the radial direction, and the end cutting edge second surfaces 4a to 4f are laid between the center cut edges 10a to 10f and the end cutting edges 2a to 2f on the rear side of both in the rotation direction. Accordingly, the center cut edge second surfaces become a part of the end cutting edge second surfaces 4a to 4f close to the rotation axis O. The center cut edge rake faces (25d) become a part of the end cutting edge rake faces 11a to 11f. There may be a case where the end cutting edge rake faces 11a to 11f including the center cut edge rake faces (25d) have a planar surface and a curved surface.

First gash surfaces 8a to 8f are formed on the outer peripheral side of the center grooves 10A to 10F in the radial direction and a rear side of parts or the end cutting edge second surfaces 4a to 4f in the rotation direction close to the rotation axis O. The first gash surfaces 8a to 8f constitute first gashes 8 together with the end cutting edge rake faces 11a to 11f close to the center in the radial direction. Second gash surfaces 9a to 9f are formed on the outer peripheral side of the first gash surfaces 8a to 8f in the radial direction. The second gash surfaces 9a to 9f constitute second gashes 9 together with the end cutting edge rake faces 11a to 11f close to the outer periphery in the radial direction.

The first gashes 8 are configured of the end cutting edge rake faces 11a to 11f and the first gash surfaces 8a to 8f, which are formed on the front side of the end cutting edge rake faces 11a to 11f in the rotation direction. The second gashes 9 are configured of the end cutting edge rake faces 11a to 11f and the second gash surfaces 9a to 9f. As illustrated in FIG. 4 flutes 20a to 20f which serve as swarf discharge grooves, are continuous with, the outer peripheral side of the second cash surfaces 9a to 9f (the second gashes 9) in the radial direction. The flutes 20a to 20f are spirally formed between the peripheral cutting edges 13a-13b, 13b-13c, 13c-13d, 13d-13e, and 13e-13f, which are adjacent in the rotation direction of the toot indicated by R in FIG. 1. There may be a case where the first gash surfaces 8a to 8f and the second gash surfaces 9a to 9f have a planar surface and a curved surface.

As illustrated in FIG. 1 end cutting edge third surfaces 6a to 6f, which are continuous with the first mash surfaces 8a to 8f, are continuous with the rear side of parts of the end cutting edge second surfaces 4a to 4f in the rotation direction close to the outer periphery in the radial direction, and the second gash surfaces 9a to 9f are continuous with the rear side of the end cutting edge third surfaces 6a to 6f in the rotation direction. There may be a case where the end cutting edge third surfaces 6a to 6f have a planar surface and a curved surface.

With the radius type end mill 40, as illustrated in FIG. 1 and FIG. 4, corner radius edge second surfaces 5a to 5f are continuous with the rear side of the corner radius edges 3a to 3f in the rotation direction and corner radius edge third surfaces 7a to 7d are continuous with the rear side of the corner radius edge second surfaces 5a to 5f in the rotation direction. As illustrated in FIG. 4, the flutes 20a to 20f are continuous with the rear side of the corner radius edge second surfaces 5a to 5f and the corner radius edge third surfaces 7a to 7d in the rotation direction. The flutes 20a to 20f smoothly continues so as to have, for example, a curved surface whose curvature continuously changes to avoid forming a discontinuous surface with peripheral cutting edge rake faces 16a to 16f on the rear side in the rotation direction. There may be a case where the corner radius edge second surfaces 5a to 5f and, the corner radius edge third surfaces 7a to 7d have a planar surface and a curved surface.

The center grooves 10A to 10F, which form the center cut edges 10a to 10f, are as illustrated in FIG. 1 and FIG. 2-(a), which is the enlarged view of FIG. 1, formed into a fan shape where like connecting points F1 to F6, which connect the center cut edges 10a to 10f with the end cutting edges 2a to 2f rotate about the rotation axis O. Alternatively, as illustrated in FIG. 2-(b), the center grooves 10A to 10F are formed into strip shapes passing through the rotation axis O and having substantially (approximately) uniform width in the radial direction or strip shapes having a gradually changing width in the radial direction. With the fan shape, the widths of the center grooves 10A to 10F are gradually created and enlarged from the rotation axis O to the first gashes 8.

To increase a volume of the center grooves 10A to 10F in the rotation axis O direction (depth direction) and to secure dischargeability of swarfs cut by the center cut edges 10a to 10f, when the center grooves 10A to 10F are viewed from the end cutting edge second surfaces 4a to 4f on the rear side of the respective center grooves 10A to 10F in the rotation direction as illustrated in FIG. 3-(a) and (b), or when viewed from the first gash surfaces 8a to 8f on the outer peripheral side of the respective center grooves 10A to 10F in the radial direction, the center grooves 10A to 10F are formed into a groove shape with a certain depth. As illustrated in FIG. 3, a crass-sectional shape of the center grooves 10A to 10F when viewed on a cross section passing through the center grooves 10A to 10F and parallel to the rotation axis O may be formed into a concave curved line (concave curved surface) or may be formed into a multangular shape (concave polyhedron) on the tool body side.

Since in the drawings, the curvature of the center cut edges 10a to 10f is differentiated from the curvature of the end cutting edges 2a to 2f when the tool end surface is viewed from the rotation axis O direction, FIG. 2-(a) clearly shows boundaries between the center cut edges 10a to 10f and the end cutting edges 2a to 2f as the connecting points F1 to F4. However, in the case where the curvature of the center cut edges 10a to 10f and the curvature of the end cutting edges 2a to 2f continuously change, the connecting points F1 to F4 are not clearly shown is some cases. While FIG. 2-(b) does not illustrate the connecting points F1 to F4, the boundaries between the center cut edges 10a to 10f and the end cutting edges 2a to 2f are shown. Since the first gashes 8 are continuous with the outer peripheral side of the center grooves 10A to 10F in the radial direction, the connecting points F1 to F4 are also the boundaries between the center grooves 10A to 10F on the center cut edges 10a to 10f and the first gashes 8.

As described above, as a result of forming (grinding) the center grooves 10A to 10F on the tool body, the center cut edges 10a to 10f are formed as the convex ridgelines of the rear side of the center grooves 10A to 10F in the rotation direction. Additionally, the center grooves 10A to 10F are formed passing through the rotation axis O. In view of this, the center cut edges 10a to 10f are formed facing the rotation axis O or are formed passing through the rotation axis O to the outer peripheral side in the radial direction (radially outside). Accordingly, the center cut edges 10a to 10f can circularly cut the work material in the region from the rotation axis O to the outer peripheral side in the radial direction during the rotation of the tool. Therefore, the end mill 40 has an ability to ensure handling the thrust process by which the end mill 40 scans in the rotation axis O direction and the helical process by which the end mill 40 spirally cuts in the work material.

It is appropriate that a length Lc of the center cut edges 10a to 10f shown in FIG. 2-(a) is in a range of around 0.01 to 0.3 times of a tool diameter D shown in FIG. 4 because of the following, reason. With Lc<0.01 D, the extremely Short length of the center cut edges 10a to 10f deteriorates a resistive power (rigidity) against a resistance from the work material that the center cut edges 10a to 10f receive during the cutting. Consequently, a chipping due to the deterioration of machinability of the center cut edges 10a to 10f is likely to occur. Meanwhile, with Lc>0.3 D the length of the end cutting edges 2a to 2f occupied in the cutting edges 1A is shortened. This narrows the width of the first gashes 8, which are constituted of the end cutting edge rake laces 11a to 11f formed on the front side of the end cutting edges 2a to 2f at the rotation in the rotation direction, resulting in deterioration of the dischargeability of the swarf.

It is appropriate that a concave slope angle (end cutting edge concavity angle) of the center cut edges 10a to 10f is equivalent to or approximately equivalent to a concave slope angle α of the end cutting edges 2a to 2f shown in FIG. 4 and is in a range of around 0.5 to 3.0° because of the following reason. With α<0.5°, the end cutting edges 2a to 2f and the center cut edges 10a to 10f are likely to simultaneously contact the work material in the thrust process. This increases the cutting resistance that the end mill 40 itself receives from the work material and therefore the chipping and a fracture are apprehended. Meanwhile, with α>3.0°, a period during which the end cutting edges 2a to 2f alone cut the work material lengthens by a longer period from the end cutting edges 2a to 2f contacting the work material until the center cut edges 10a to 10f contacting the work material. This increases the cutting resistance that the end cutting edges 2a to 2f receive, being likely to generate the chipping in the end cutting edges 2a to 2f.

It is appropriate that peripheral cutting edge rake angles β1 and β2 of the end mill 40 shown in FIG. 6 and FIG. 11 are in a range of around −20 to −12° because of the following reason. The "−" means that the peripheral cutting edge rake faces 16a to 16f incline on the rear side in the rotation direction with respect to a straight line in the radial direction passing through the rotation axis O. With the peripheral cutting edge rake angles β1 and β2<−20° (absolute values of the rake angles β1 and β2 are larger than 20°), the cutting ability of the peripheral cutting edges 13a to 13f is likely to be deteriorated. Meanwhile, with β1 and β2>−12° (the absolute values of the rake angles β1 and β2 are smaller than 12°), since the rigidity of the peripheral cutting edges 13a to 13f is likely to be deteriorated, making the stable cutting difficult.

It is appropriate that helix angles γ1 and γ2 of the end mill 40 shown in FIG. 4 and FIG. 9 are in a range of around 35 to 55°, and 40 to 50° is more preferable because of the following reason. With the helix angles γ1 and γ2<35°, since the cutting resistance that the respective peripheral cutting edges 13a to 13f receive in the rotation direction in the thrust process is large, making the stable cutting work difficult. Meanwhile, with the helix angles γ1 and γ2>55°, the thrust process and the helical process in the axis direction of the end mill 40 strengthens a power of the respective peripheral cutting edges 13a to 13f pulling up the work material, resulting in a failure of the stable cutting. Additionally, this thins an edge thickness of the corner radius edges 3a to 3f, and deterioration in cutting edge strength is likely to cause a chipping, a break, or a similar defect.

To secure the stability during the cutting by the thrust process and the helical process, as illustrated in FIG. 6, the core diameter Dw of the end mill 40 is configured be 60 to 75% of the tool diameter D illustrated in FIG. 4 and more preferably in a range of 65 to 70%. As illustrated in FIG. 6, the shape of the flutes 20a to 20f including the peripheral cutting edge rake faces 16a to 16f when a cross section perpendicular to the rotation axis O of the end mill 40 is viewed in the rotation axis O direction is a curved surface. Here, assuming that an area of a circle having the tool diameter D of the end mill 40 as a diameter as S, it is appropriate that a sum of the areas of the plurality of flutes 20a to 20f on the cross sections of the peripheral cutting edges 13a to 13f perpendicular to the rotation axis O is in a range of around 0.3 to 0.4 S. The sum of the areas of the flutes 20a, to 20f with respect to the area S of the end mill 40 on the cross section of the end mill 40 perpendicular to the rotation axis O is employed as an index indicative of a quality of dischargeability of the swarfs through the flutes 20a to 20f.

With the sum of the areas the flutes 20a to 20f of less than 0.3 S, since the dischargeability of swarfs is likely to be deteriorated, the end mill 40 is likely to cause a breakage. With the sum of more than 0.4 S, it is difficult to maintain an optimal wedge angle. This extremely deteriorates the rigidity of the end mill 40, increasing a possibility of the breakage in the end mill 40. According to these points, the sum of the areas of the flutes 20a to 20f in a range of around 0.3 to 0.4 S secures the good swarf dischargeability through the wide flutes 20a to 20f regions.

In the case where the cutting work is performed on the difficult-to-cut material at the cutting velocity Vc exceeding 300 m/min, especially at an ultrahigh speed exceeding 500 m/min using an end mill manufactured of a cemented carbide tool, which is widely employed as the cutting tool generally, an excessive cutting load is more likely to generate the breakage in the end mill. In contrast to this, the present invention uses the end mill 40 whose base material is especially constituted of a silicon nitride-based ceramic as described above. Therefore, even when the ultrahigh speed cutting work is perforated with the core diameter of 60 to 75%, the high heat resistance reduces a damage of the tool small for a long period, thereby ensuring continuing, the cutting without the breakage. Consequently, provisionally, even if abrasion occurs in the cutting edges 1A, the cutting edges 1A after the abrasion, especially a section from the end cutting edges 2a to 2f to the corner radius edges 3a to 3f can function as the cutting edges thereafter.

With end mills 40 and 60 of the present invention, a cutting edge ridgeline portion of the cutting edge 1A is processed to have the slight curvature, thus ensuring improving the culling edge strength and extending cutting life. In this case, a curvature radius of the cutting edge ridgelines of the end cutting edges 2a to 2f is preferably smaller than a curvature radius of the cutting edge ridgelines of the peripheral cutting edges 13a to 13f. The curvature radius of the cutting edge ridgelines of the end cutting edges 2a to 2f is more preferably from 1.0 μm to 4.0 μm. The curvature radius of the cutting edge ridgelines of the peripheral cutting edges 13a to 13f is more preferably from 4.5 μm to 15.0 μm. The above-described effects improve the cutting edge strength of the peripheral cutting edges 13a to 13f whose peripheral velocity is fast and load during the cutting is large and also can enhance the machinability of the end cutting edges 2a to 2f whose peripheral velocity is slow.

FIG. 7 to FIG. 11 illustrate manufacturing examples of the six-flute radius type end mill 60. With the case of the six flutes, the configuration of the respective cutting edges 1A and configurations of the respective rake faces continuous with the front side of the cutting edges 1A in the rotation direction and the respective flanks continuous with the rear side in the rotation direction do not change from the case of the four flutes in principle. FIG. 7 to FIG. 11 illustrate the flutes 20a to 20f formed on the rear side of the corner radius edge second snakes 5a to 5f in the rotation direction. These flutes 20a to 20f double as the corner radius edge third surfaces 7a to 7d.

Working Example

The following shows results of comparisons between the end mill 60 as Working Example 1 of the present invention that has the above-described requirements and end mills of Comparative Examples 1 and 2 that do not have the requirements of the present invention used for side surface working of a work material in Table 1. While the end mill 60 of the present invention contains a SiAlON-based ceramic as a base material, base materials of the end mills of Comparative Examples 1 and 2 are a cemented carbide, and a hard coating is performed on surfaces of the tools. Example of Present Invention 1 differs from Comparative Examples 1 and 2 in these points. Comparative Example 2 differs from Example of Present invention 1 and Comparative Example 1 in that the cutting velocity Vc is configured slow to avoid a high cutting temperature. The end mill 60 of Example of Present Invention 1 and the end mill of Comparative Example 1 performed the cutting under similar processing conditions. Meanwhile, Comparative Example 2 employed side surface cutting conditions of an Ni-based heat-resistant alloy for a general ultrahard radius end mill as the process conditions.

TABLE 1

|  | Example of present invention 1 | Comparative example 1 | Comparative example 2 |
|---|---|---|---|
| Tool material | Ceramic | Cemented carbide | |
| Work Material | Ni-based heat-resistant alloy | | |
| Tool diameter [mm] | φ10 | | |
| Number of flutes | Six flutes | | |
| Rotation rate [min−1] | 20000 | 20000 | 2548 |
| Cutting speed [m/min] | 628 | 628 | 80 |
| Feed speed [mm/min] | 3600 | 3600 | 611 |
| Feed per flute [mm/t] | 0.03 | 0.03 | 0.04 |
| Amount of axial notch [mm] | 7 | 7 | 6 |
| Amount of radial notch [mm] | 0.3 | 0.3 | 0.5 |
| Amount of discharged swarf Q [cc/min] | 7.56 | 7.56 | 1.83 |
| Life span [m] | 25 | 0.2 | 5 |
| Total amount of discharged swarf Qt [cc] | 53 | 0.4 | 15 |
| Process time until life ends [min] | 7 | 0.056 | 8.2 |

It is found from Table 1 that, the end mill 60 of Example of Present Invention 1 did not cause a breakage, up to 25 m, and was able to perform the cutting work on the Ni-based heat-resistant alloy in a short period, seven minutes (life span, process time). In contrast to this, with the end mill of Comparative Example 1, the tool largely fractured immediately after the start of cutting (0.2 m); therefore, there was no choice but to halt the cutting work. Although the process time until its life ends under the conditions of Comparative Example 2 is longer than that of Example of Present Invention 1 by around 1.17 times (8.2 minutes). Comparative Example 2 was able to perform the process only up to 5 m, which is ⅕ of the life span of Example of Present Invention 1, and the amount of discharged swarf was only around 1/3.5 (28%) of that of Example of Present Invention 1.

A reason that the end mill of Comparative Example 1 was fractured was considered as follows. The cutting temperature was sharply increased by the ultrahigh speed cutting, and this largely exceeded heat-resistant temperatures of the coating and an ultrahard base material. This peeled off the coating and therefore abrasion of the exposed ultrahard base material rapidly progressed. Since Comparative Example 2 configured the cutting velocity slower than that of Comparative Example 1 (1/7.85 (12.7%)), the cutting temperature was able to be reduced at a temperature lower than that of Comparative Example 1. However, a softening ramie of the Ni-based heat-resistant alloy (work material) is the high temperature, about 1,000° C. or more. Accordingly, the cutting temperature of the work material cannot be increased up to the softening range with the conditions for Comparative Example 2 met. Consequently, it is considered that, since the work material was cut at the cutting temperature not reaching the softening range, this progressed the cutting edge abrasion and the chipping occurred in the early stag.

The end mill of the present invention whose base material is the ceramic features the higher heat resistance through the comparison with Comparative Examples 1 and 2. This property allows performing the ultrahigh speed cutting with the cutting temperature increased up to 1,000° C. or more, which is the temperature of the softening range of the Ni-based heat-resistant alloy. It is considered that this reduces the abrasion of the cutting edge, thereby avoiding the chipping.

DESCRIPTION OF REFERENCE SIGNS

1 . . . cutting edge portion
1A . . . cutting edge
2a to 2f . . . end cutting edge
3a to 3f . . . corner radius edge
4a to 4f . . . end cutting edge second surface
5a to 5f . . . corner radius edge second surface
6a to 6f . . . end cutting edge third surface
7a to 7d . . . corner radius edge third surface
8 . . . first gash
8a to 8f . . . first gash surface
9 . . . second gash
9a to 9f . . . second gash surface
10 . . . center cut edge portion
10a to 10f . . . center cut edge
10A to 10F . . . center groove
11a to 11f . . . end cutting edge rake face
12a to 12f . . . corner radius edge rake face
13a to 13f . . . peripheral cutting edge
14a to 14f . . . peripheral cutting edge second surface
15a to 15f . . . peripheral cutting edge third surface
16a to 16f . . . peripheral cutting edge rake face
20a to 20f . . . flute
30 . . . shank portion
40 . . . four-flute radius end mill
60 . . . six-flute radius end mill
Wc . . . width of center groove
D . . . tool diameter
Dw . . . core diameter
F1 to F6 . . . connecting point of center cut edge with end cutting edge
O . . . rotation axis
α . . . concave slope angle
β1, β2 . . . peripheral cutting edge rake angle
γ1, γ2 . . . helix angle

The invention claimed is:

1. A ceramic end mill comprising:
a cutting edge portion that includes a plurality of cutting edges and gashes, the plurality of cutting edges being arranged on a distal end portion side of a tool body in an axis direction spaced in a rotation direction, the gashes being formed between the cutting edges adjacent in the rotation direction, wherein:
the respective cutting edges include center cut edges, end cutting edges, and peripheral cutting edges, the center cut edges being disposed from parts close to a rotation axis to an outer peripheral side in a radial direction, the center cut edges facing the rotation axis, the end cutting edges being continuous with the center cut edges, the peripheral cutting edges being continuous from the end cutting edges to a tool rear end side,
respective center grooves are formed on rear sides of the center cut edges and the end cutting edges in the rotation direction continuous in the radial direction, the center grooves being continuous with positions where end cutting edge second surfaces face the rotation axis, alternatively, the center grooves being continuous with positions where the end cutting edge second surfaces approach the rotation axis, the end cutting edge second surfaces being laid between the center cut edges and the end cutting edges, the respective center grooves being formed between the end cutting edge second surfaces and the center cut edges positioned on a rear side of the end cutting edge second surfaces in the rotation direction, the center grooves passing on the rotation axis, the center grooves doubling as rake faces of the respective center cut edges, the center grooves being continuous with the inner peripheral side of the gashes in the radial direction,
the end cutting edges have concave slope angles, the end cutting edge second surfaces inclining between the outer peripheral side in the radial direction and the rotation axis side from a distal end side in the rotation axis direction to a rear side of the tool body in the axis direction, and
the center grooves and the end cutting edge second surfaces are arranged in alternation in the rotation direction of the rotation axis O at parts of the end cutting edge second surfaces close to the rotation axis.

2. The ceramic end mill according to claim 1, wherein
the center grooves are formed into strip shapes with a uniform or gradually changing width from the rotation axis to the gashes when an end surface of the cutting edge portion is viewed in the rotation axis direction.

3. The ceramic end mill according to claim 1, wherein
corner radius edges are continuous with an outer peripheral side of the respective end cutting edges in the radial direction, the respective peripheral cutting edges being continuous from the corner radius edges to the tool rear end side.

4. The ceramic end mill according to claim 1, wherein
the end mill contains a SiAlON as a base material.

5. A method for cutting a difficult-to-cut material, comprising
cutting a difficult-to-cut material using the ceramic end mill according to claim 1, wherein
the cutting cuts the difficult-to-cut material while rotating the ceramic end mill at a cutting velocity Vc of 500 to 1200 m/min.

6. The ceramic end mill according to claim 2, wherein
corner radius edges are continuous with an outer peripheral side of the respective end cutting edges in the radial direction, the respective peripheral cutting edges being continuous from the corner radius edges to the tool rear end side.

7. The ceramic end mill according to claim 2, wherein
the end mill contains a SiAlON as a base material.

8. The ceramic end mill according to claim 3, wherein
the end mill contains a SiAlON as a base material.

9. A method for cutting a difficult-to-cut material, comprising:
cutting a difficult-to-cut material using the ceramic end mill according to claim 2, wherein
the cutting cuts the difficult-to-cut material while rotating the ceramic end mill at a cutting velocity Vc of 500 to 1200 m/min.

10. A method for cutting a difficult-to-cut material, comprising:
cutting a difficult-to-cut material using the ceramic end mill according to claim 3, wherein
the cutting cuts the difficult-to-cut material while rotating the ceramic end mill at a cutting velocity Vc of 500 to 1200 m/min.

11. A method for cutting a difficult-to-cut material, comprising:
cutting a difficult-to-cut material using the ceramic end mill according to claim 4, wherein
the cutting cuts the difficult-to-cut material while rotating the ceramic end mill at a cutting velocity Vc of 500 to 1200 m/min.

* * * * *